United States Patent
Masuda et al.

(10) Patent No.: US 11,085,380 B2
(45) Date of Patent: Aug. 10, 2021

(54) ENGINE CONTROL SYSTEM

(71) Applicant: IHI Corporation, Tokyo (JP)

(72) Inventors: Yutaka Masuda, Tokyo (JP); Takahide Aoyagi, Tokyo (JP); Takayuki Hirose, Tokyo (JP); Takayuki Yamada, Tokyo (JP); Hayato Nakajima, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/810,155

(22) Filed: Mar. 5, 2020

(65) Prior Publication Data

US 2020/0200104 A1 Jun. 25, 2020

Related U.S. Application Data

(63) Continuation of application No. PCT/JP2018/032830, filed on Sep. 5, 2018.

(30) Foreign Application Priority Data

Sep. 6, 2017 (JP) .............................. JP2017-171003

(51) Int. Cl.
*F02P 5/152* (2006.01)
*F02D 35/02* (2006.01)
(Continued)

(52) U.S. Cl.
CPC ......... *F02D 19/029* (2013.01); *F02D 35/024* (2013.01); *F02D 35/026* (2013.01);
(Continued)

(58) Field of Classification Search
CPC ...... F02D 19/02; F02D 19/021; F02D 19/025; F02D 35/023; F02D 35/024;
(Continued)

(56) References Cited

U.S. PATENT DOCUMENTS 5,036,669 A * 8/1991 Earleson ................. F02P 5/045
60/602
5,765,530 A * 6/1998 Machida ................. F02P 5/103
123/406.43

(Continued)

FOREIGN PATENT DOCUMENTS

DE 102015210745 A1 12/2015
EP 1473452 A2 11/2004

(Continued)

OTHER PUBLICATIONS

International Search Report issued for International Application No. PCT/JP2018/032830 dated Nov. 13, 2018, 4 pages.

(Continued)

*Primary Examiner* — John M Zaleskas
(74) *Attorney, Agent, or Firm* — Rothwell, Figg, Ernst & Manbeck, P.C.

(57) ABSTRACT

An engine control system includes: a delay estimating unit configured to estimate a auto-ignition delay based on first parameters including a composition of fuel gas; a auto-ignition predicting unit configured to predict a auto-ignition timing based on the auto-ignition delay; a completion predicting unit configured to predict a combustion completion timing of the fuel gas; and an operation control unit configured to control an engine based on a result of comparison between the auto-ignition timing and the combustion completion timing.

14 Claims, 4 Drawing Sheets

(51) Int. Cl.
  *F02D 19/02* (2006.01)
  *F02D 41/00* (2006.01)
  *F02P 23/00* (2006.01)
(52) U.S. Cl.
  CPC ....... *F02D 35/028* (2013.01); *F02D 41/0027* (2013.01); *F02P 5/152* (2013.01); *F02P 23/00* (2013.01)
(58) Field of Classification Search
  CPC .... F02D 35/025; F02D 35/026; F02D 35/028; F02D 41/0027; F02D 2200/0611; F02D 2200/0612; F02B 1/12; F02P 5/152
  See application file for complete search history.

(56) References Cited

U.S. PATENT DOCUMENTS

| | | | | |
|---|---|---|---|---|
| 6,557,526 | B1 * | 5/2003 | Hoshino | F02P 5/1502 123/406.26 |
| 6,843,208 | B2 * | 1/2005 | Tamura | F02M 43/00 123/1 A |
| 7,184,877 | B1 * | 2/2007 | de Ojeda | F02D 41/1401 701/104 |
| 2001/0052335 | A1 * | 12/2001 | Miyakubo | F02D 13/0265 123/305 |
| 2003/0145836 | A1 | 8/2003 | Linna et al. | |
| 2004/0094124 | A1 * | 5/2004 | Viele | F02P 17/12 123/406.27 |
| 2004/0220720 | A1 * | 11/2004 | Noda | F02P 5/1522 701/111 |
| 2005/0183697 | A1 * | 8/2005 | Yoshino | F02P 5/152 123/406.37 |
| 2005/0188954 | A1 * | 9/2005 | Yoshino | F02D 35/025 123/406.29 |
| 2005/0197762 | A1 * | 9/2005 | Yoshino | F02P 5/153 701/111 |
| 2005/0229903 | A1 * | 10/2005 | Kobayashi | F02D 41/3064 123/435 |
| 2005/0268886 | A1 * | 12/2005 | Etou | F02P 5/1527 123/406.29 |
| 2007/0255487 | A1 * | 11/2007 | Etou | F02D 19/088 701/105 |
| 2008/0046160 | A1 * | 2/2008 | Agrell | F02D 13/0265 701/101 |
| 2008/0228375 | A1 | 9/2008 | Ashida et al. | |
| 2009/0182485 | A1 * | 7/2009 | Loeffler | F02D 41/3064 701/103 |
| 2010/0071659 | A1 * | 3/2010 | Moriya | F02D 41/345 123/406.41 |
| 2010/0089363 | A1 | 4/2010 | Moriya | |
| 2010/0242912 | A1 * | 9/2010 | Folkerts | G01L 23/225 123/435 |
| 2010/0305833 | A1 * | 12/2010 | Matsunaga | F02D 35/025 701/105 |
| 2010/0312454 | A1 * | 12/2010 | Nada | F02D 41/403 701/103 |
| 2011/0079194 | A1 * | 4/2011 | Tanaka | F02D 41/3035 123/295 |
| 2011/0259298 | A1 * | 10/2011 | Imamura | F02B 19/108 123/436 |
| 2013/0080030 | A1 * | 3/2013 | Chi | F02D 35/028 701/103 |
| 2013/0192561 | A1 * | 8/2013 | Hasegawa | F02D 41/047 123/435 |
| 2014/0053808 | A1 * | 2/2014 | Nakasaka | F02D 35/024 123/406.12 |
| 2014/0303876 | A1 * | 10/2014 | Taniguchi | F02D 41/1456 701/104 |
| 2015/0159565 | A1 * | 6/2015 | Suzuki | F02D 41/0002 701/104 |
| 2015/0159618 | A1 * | 6/2015 | Nakasaka | F02P 5/153 123/406.33 |
| 2015/0233313 | A1 * | 8/2015 | Fimml | F02D 19/088 123/435 |
| 2015/0322896 | A1 * | 11/2015 | Arnold | F02D 19/024 123/445 |
| 2016/0010581 | A1 * | 1/2016 | Sixel | F02D 35/027 60/601 |
| 2016/0084179 | A1 * | 3/2016 | Holst | F02D 41/0027 123/406.45 |
| 2016/0123247 | A1 * | 5/2016 | Mizoguchi | F02D 41/3005 123/406.55 |
| 2016/0237923 | A1 * | 8/2016 | Kitagawa | F02D 35/028 |
| 2016/0290307 | A1 * | 10/2016 | Urano | F02D 37/02 |
| 2016/0369727 | A1 * | 12/2016 | Kitagawa | F02D 37/02 |
| 2017/0009672 | A1 * | 1/2017 | Sasaki | G01L 23/24 |
| 2017/0022911 | A1 * | 1/2017 | Kitagawa | F02D 41/28 |
| 2017/0030283 | A1 * | 2/2017 | Sasaki | F02D 41/2438 |
| 2017/0030299 | A1 * | 2/2017 | Ar Ztegui Cortijo | F02M 21/0275 |
| 2017/0037791 | A1 * | 2/2017 | Kitagawa | F02D 41/28 |
| 2017/0314499 | A1 * | 11/2017 | Urano | F02D 41/1475 |
| 2017/0363028 | A1 * | 12/2017 | Iwadare | F02B 31/06 |
| 2017/0363037 | A1 * | 12/2017 | Iwadare | F02D 41/26 |
| 2018/0030909 | A1 * | 2/2018 | Kitagawa | F02D 35/028 |
| 2018/0113963 | A1 * | 4/2018 | Kordon | F02D 41/26 |
| 2018/0275016 | A1 * | 9/2018 | Okabayashi | F02B 77/04 |
| 2018/0372055 | A1 * | 12/2018 | Hirayama | F02B 19/108 |

FOREIGN PATENT DOCUMENTS

| | | | |
|---|---|---|---|
| EP | 2966284 A1 | 1/2016 | |
| JP | H08-121201 A | 5/1996 | |
| JP | H10-148143 A | 6/1998 | |
| JP | 2003-239836 A | 8/2003 | |
| JP | 2004-332584 A | 11/2004 | |
| JP | 2005-315099 A | 11/2005 | |
| JP | 2006002637 A * | 1/2006 | ............ F02P 15/08 |
| JP | 3998744 B | 10/2007 | |
| JP | 2008101591 A * | 5/2008 | |
| JP | 2008-223567 A | 9/2008 | |
| JP | 4256767 B | 4/2009 | |
| JP | 2016-003589 A | 1/2016 | |
| JP | 6002235 B | 10/2016 | |
| JP | 2017-082799 A | 5/2017 | |

OTHER PUBLICATIONS

Extended European Search Report for EP Application No. 18853187.5 dated May 21, 2021 (8pp).

\* cited by examiner

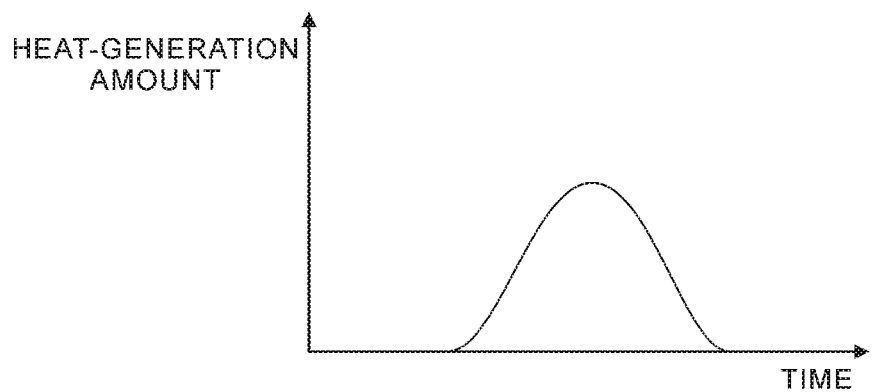
FIG. 4A
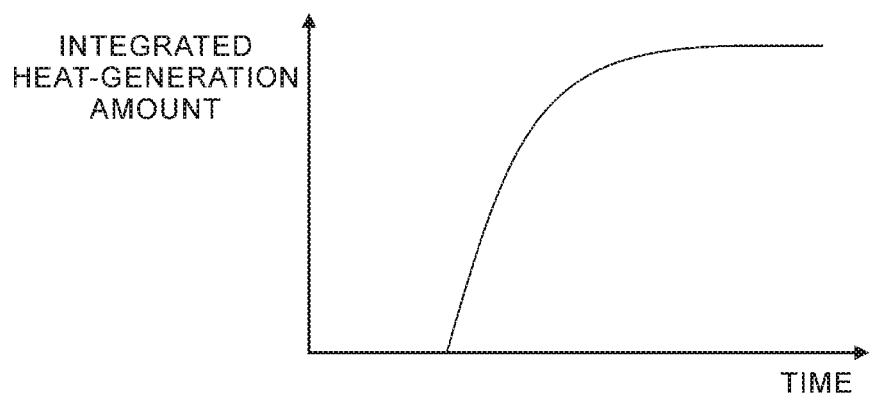
FIG. 4B
| | EFFICIENCY IMPROVEMENT CONTROL | KNOCKING SUPPRESSION CONTROL |
|---|---|---|
| INTAKE TEMPERATURE | — | ↓ |
| INTAKE PRESSURE | — | ↑ |
| IGNITION TIMING | ADVANCE | DELAY |
| COMPRESSION RATIO | ↑ | ↓ |
FIG. 5

ENGINE CONTROL SYSTEM

CROSS REFERENCE TO RELATED APPLICATIONS

This application is a continuation application of International Application No. PCT/JP2018/032830, filed on Sep. 5, 2018, which claims priority to Japanese Patent Application No. 2017-171003, filed on Sep. 6, 2017, the entire contents of which are incorporated by reference herein.

BACKGROUND ART

Technical Field

The present disclosure relates to an engine control system configured to control an engine in accordance with a composition of fuel gas.

Related Art

Hitherto, an engine configured to combust fuel gas being a gaseous fuel has become widespread. In such an engine, knocking due to abnormal combustion of the fuel gas is required to be suppressed. For example, in Patent Literature 1, there is disclosed a technology of analyzing a composition of the fuel gas and determining a possibility of occurrence of the knocking based on the composition of the fuel gas and a load on the engine.

CITATION LIST

Patent Literature

Patent Literature 1: Japanese Patent Application Laid-Open No. H08-121201

SUMMARY

Technical Problem

In the engine described in Patent Literature 1, for example, even when there is a sufficient allowance in operating conditions before the occurrence of knocking, it is merely determined that there is no possibility of the occurrence of the knocking.

In view of the problem described above, the present disclosure has an object to provide an engine control system capable of suppressing knocking while grasping a degree before occurrence of the knocking.

Solution to Problem

In order to solve the above-mentioned problem, according to the present disclosure, there is provided an engine control system, including: a delay estimating unit configured to estimate a auto-ignition delay based on first parameters including a composition of fuel gas; a auto-ignition predicting unit configured to predict a auto-ignition timing based on the auto-ignition delay; a completion predicting unit configured to predict a combustion completion timing of the fuel gas; and a control unit configured to control an engine based on a result of comparison between the auto-ignition timing and the combustion completion timing.

The delay estimating unit may estimate the auto-ignition delay at each of a plurality of time points in a time period from start of fuel injection to auto-ignition, and the auto-ignition predicting unit may predict one of the time points, at which an integrated value of reciprocals of the auto-ignition delay becomes equal to or larger than 1, as the auto-ignition timing.

The engine control system may further include an in-cylinder variable acquiring unit configured to acquire an in-cylinder pressure and an in-cylinder temperature as the first parameters, and the delay estimating unit may estimate the auto-ignition delay in accordance with values of the in-cylinder pressure and values of the in-cylinder temperature at the plurality of time points.

The in-cylinder variable acquiring unit may estimate the in-cylinder pressure and the in-cylinder temperature based on a second parameter including the composition of the fuel gas.

The completion predicting unit may predict the combustion completion timing based on one of a combustion speed of the fuel gas and the in-cylinder pressure, and an injection amount of the fuel gas.

The control unit may change at least one of an intake temperature, an intake pressure, an injection amount of the fuel gas, a fuel injection timing, and a compression ratio.

Effects of Disclosure

According to the present disclosure, the engine control system is capable of suppressing knocking while grasping a degree before occurrence of the knocking.

BRIEF DESCRIPTION OF DRAWINGS

FIG. 4A is a graph for showing an example of a heat-generation amount by combustion of fuel gas.

FIG. 4B is a graph for showing an example of an integrated value of the heat-generation amount by the combustion of the fuel gas.

FIG. 5 is a table for showing processing performed by an operation control unit.

DESCRIPTION OF EMBODIMENT

Figure 1:
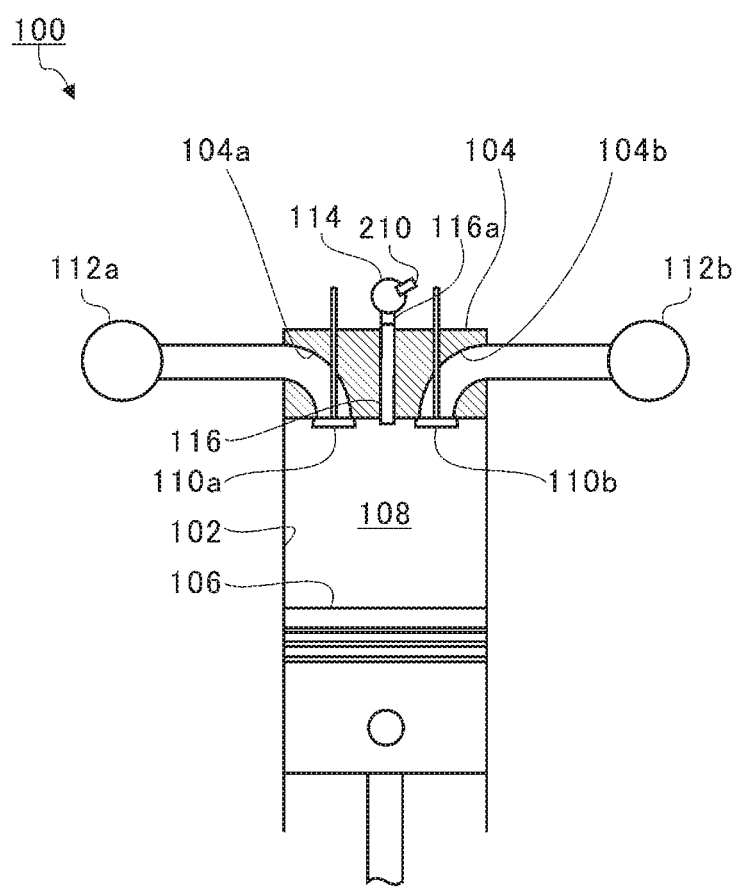
FIG. 1 is a diagram for illustrating a schematic configuration of a gas engine (engine).

Now, with reference to the attached drawings, an embodiment of the present disclosure is described in detail. The dimensions, materials, and other specific numerical values represented in the embodiment are merely examples used for facilitating the understanding of the disclosure, and do not limit the present disclosure unless otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a diagram for illustrating a schematic configuration of a gas engine 100 (engine). In FIG. 1, an intake port 104*a*, an exhaust port 104*b*, and a fuel injection nozzle 116 are illustrated on the same cross section. However, the intake port 104*a*, the exhaust port 104*b*, and the fuel injection nozzle 116 are not required to be located on the same cross section.

As illustrated in FIG. 1, the gas engine 100 includes a cylinder 102, a cylinder head 104, and a piston 106. The piston 106 is accommodated in the cylinder 102. The cylinder 102, the cylinder head 104, and the piston 106 form a combustion chamber 108.

The cylinder head 104 has the intake port 104a and the exhaust port 104b. The intake port 104a and the exhaust port 104b are open to the combustion chamber 108. An intake valve 110a is configured to open and close an opening of the intake port 104a, which is on the combustion chamber 108 side. The exhaust valve 110b is configured to open and close an opening of the exhaust port 104b, which is on the combustion chamber 108 side.

An intake pipe 112a is connected to the intake port 104a. Intake air is introduced into the intake pipe 112a. The intake air flows into the combustion chamber 108 through the intake pipe 112a and the intake port 104a. An exhaust pipe 112b is connected to the exhaust port 104b. Exhaust air, which has been discharged from the combustion chamber 108 to the exhaust port 104b, is discharged to an outside through the exhaust pipe 112b.

A fuel gas pipe 114 is connected to a fuel tank (not shown) and the fuel injection nozzle 116. A gas-composition sensor 210, which is described later, is provided to the fuel gas pipe 114. The fuel injection nozzle 116 is provided in the cylinder head 104. A distal end of the fuel injection nozzle 116 projects into the combustion chamber 108. The fuel injection nozzle 116 is opened and closed by a fuel valve 116a. The fuel gas pipe 114 communicates with the combustion chamber 108 through the fuel injection nozzle 116. Fuel gas is introduced into the fuel gas pipe 114 from the fuel tank. When the fuel injection nozzle 116 is opened by the fuel valve 116a, the fuel gas is injected into the fuel chamber 108.

In this case, the fuel gas is produced by, for example, gasifying a liquefied natural gas (LNG). The fuel gas is not limited to those produced by gasifying the LNG, and there may also be used fuel gas produced by gasifying, for example, a liquefied petroleum gas (LPG), a light oil, or a heavy oil.

The gas engine 100 is, for example, a four-cycle engine. On an intake stroke, the intake valve 110a is opened, and the exhaust valve 110b is closed. The piston 106 moves toward a bottom dead center. The intake air flows through the intake port 104a into the combustion chamber 108. On a compression stroke, the intake valve 110a and the exhaust valve 110b are closed. The piston 106 moves toward a top dead center to compress an air-fuel mixture. The fuel is injected from the fuel injection nozzle 116 into the combustion chamber 108. On a combustion stroke, the fuel gas (air-fuel mixture) automatically ignites. The air-fuel mixture is combusted, and the piston 106 is pressed toward the bottom dead center. On an exhaust stroke, the intake valve 110a is closed, and the exhaust valve 110b is opened. The piston 106 moves toward the top dead center. Exhaust gas generated after the combustion passes through the exhaust port 104b to be discharged from the combustion chamber 108.

Figure 2:
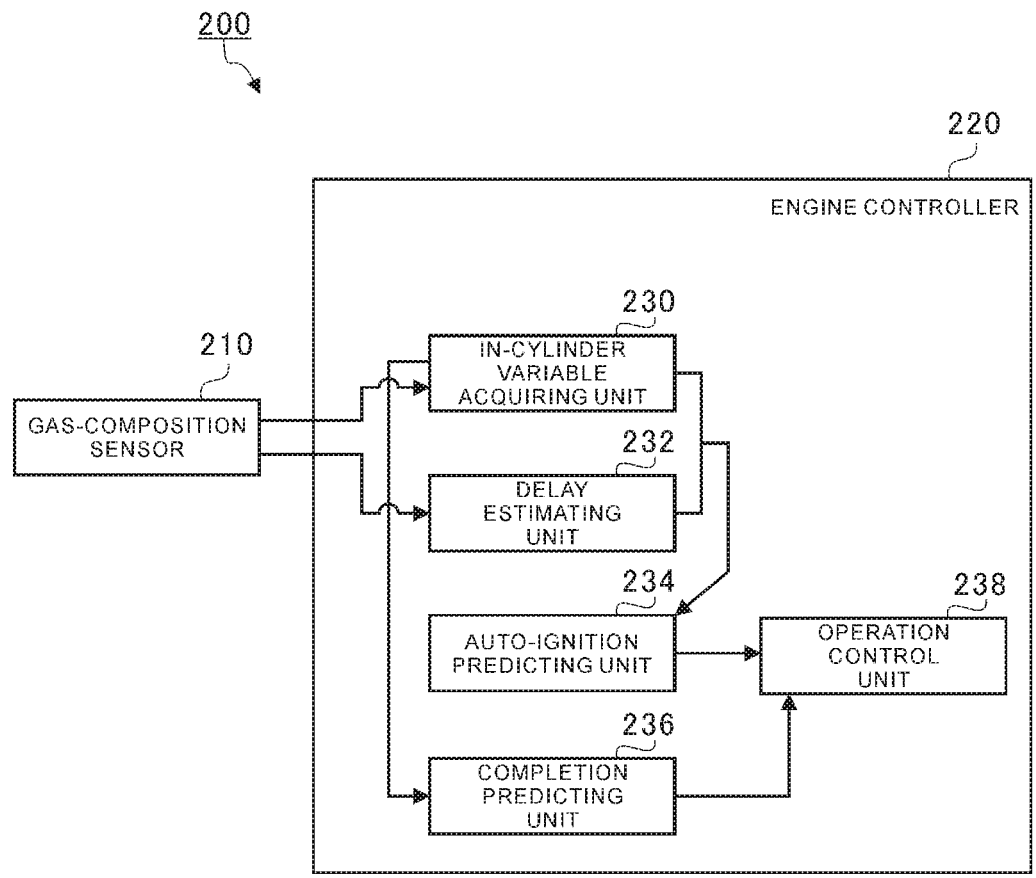
FIG. 2 is a functional block diagram of an engine control system.

FIG. 2 is a functional block diagram of an engine control system 200. As illustrated in FIG. 2, the engine control system 200 includes the gas-composition sensor 210 and an engine controller 220.

The gas-composition sensor 210 is formed of, for example, a gas chromatography or a composite sensor module including an infrared spectroscopic sensor and a hydrogen sensor, and is configured to measure a composition of the fuel gas flowing through the fuel gas pipe 114. A measurement result obtained by the gas-composition sensor 210 is output at a frequency of, for example, about once an hour. The composition of the fuel gas is expressed as, for example, content ratios of components.

The engine controller 220 is formed of, for example, an engine control unit (ECU). The engine controller 220 includes a central processing unit (CPU), a ROM, a RAM, and the like. The ROM stores programs and the like. The RAM serves as a work area. The engine controller 220 is configured to control the entire gas engine 100. Further, the engine controller 220 functions as an in-cylinder variable acquiring unit 230, a delay estimating unit 232, a auto-ignition predicting unit 234, a completion predicting unit 236, and an operation control unit 238.

The in-cylinder variable acquiring unit 230 acquires an internal pressure of the cylinder 102 (in-cylinder pressure) and an internal temperature of the cylinder 102 (in-cylinder temperature). More specifically, the in-cylinder variable acquiring unit 230 derives the in-cylinder pressure and the in-cylinder temperature based on in-cylinder variable acquisition parameters (second parameters). The in-cylinder variable acquisition parameters include operating conditions of the gas engine 100 (an intake temperature, an intake pressure, an injection amount of the fuel gas (air-fuel mixture concentration), a fuel injection timing, and a compression ratio) and the composition of the fuel gas. However, the in-cylinder variable acquisition parameters are only required to include at least the composition of the fuel gas. In this case, the intake temperature and the intake pressure may be, for example, actual measurement values respectively obtained by a temperature sensor and a pressure sensor. The intake temperature and the intake pressure may be, for example, estimated values acquired through estimation based on an actuation state of a supercharger (compressor) configured to compress the intake air or a cooler configured to cool the intake air.

A response surface of a combustion speed is stored in advance in the engine controller 220. The response surface of the combustion speed is created by associating the plurality of parameters including the in-cylinder pressure, the in-cylinder temperature, the composition of the fuel gas, the injection amount of the fuel gas (air-fuel mixture concentration) with the combustion speed of the fuel gas. For the composition of the fuel gas, for example, combination patterns of content ratios of components are registered in advance. Based on a measured composition of the fuel gas, a pattern closest to the composition of the fuel gas is specified.

The response surface of the combustion speed may be given, for example, in the form of a plurality of maps or in the form of a functional model. The in-cylinder variable acquiring unit 230 derives (estimates) the combustion speed of the fuel gas based on the response surface of the combustion speed and the in-cylinder variable acquisition parameters. Then, the in-cylinder variable acquiring unit 230 derives the in-cylinder pressure and the in-cylinder temperature based on the combustion speed of the fuel gas and the operating conditions of the gas engine 100.

Figure 3:
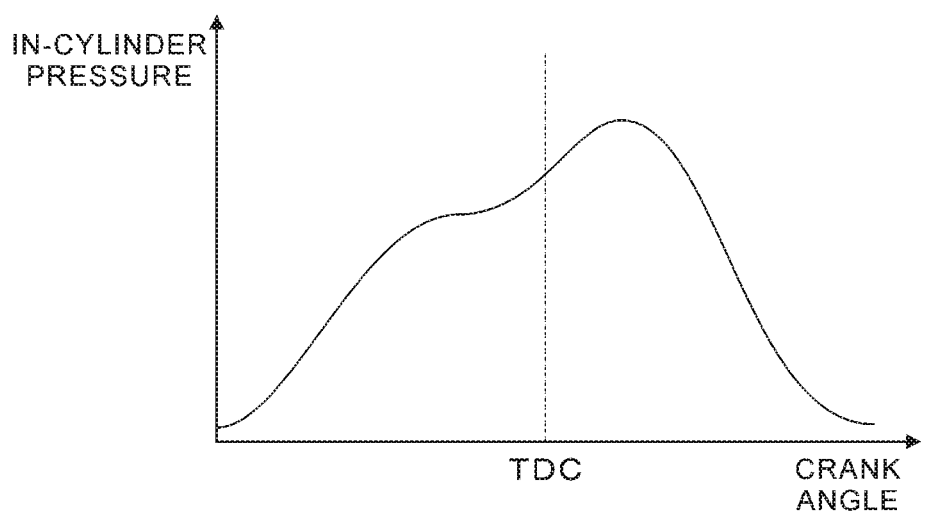
FIG. 3 is a graph for showing an example of a change in in-cylinder pressure.

FIG. 3 is a graph for showing an example of a change in in-cylinder pressure. The in-cylinder variable acquiring unit 230 derives the in-cylinder pressure and the in-cylinder temperature at a plurality of time points in, for example, a predetermined time period. In this case, the predetermined time period corresponds to a time period, for example, from closing of the intake valve 110a and the exhaust valve 110b through passage beyond a top dead center (TDC) to opening of the exhaust valve 110b. Intervals of the plurality of time points each correspond to, for example, a crank angle of 0.1 degree. As an initial value of the in-cylinder pressure and an initial value of the in-cylinder temperature before the compression, the intake pressure and the intake temperature, which are described above, are respectively set. The in-cylinder pressure and the in-cylinder temperature after the compression are derived with use of a set compression ratio. Further, the combustion speed is derived based on the in-cylinder variable acquisition parameters including the in-cylinder pressure and the in-cylinder temperature at the ignition time point, which have been derived, and the response surface of the combustion speed. Subsequently, a combustion amount of fuel, which is combusted by a next time point of the ignition time point, is derived from the derived combustion speed, and the in-cylinder pressure at the next time point of the ignition time point is derived from the combustion amount. The in-cylinder temperature is derived from the in-cylinder pressure and the combustion amount (heat-generation amount), which have been derived. The combustion speed at the next time point of the ignition time point is derived from the in-cylinder variable acquisition parameters including the in-cylinder pressure and the in-cylinder temperature, which have been derived, and the response surface of the combustion speed. As described above, when the initial values are given, the in-cylinder pressure, the in-cylinder temperature, and the combustion speed can be sequentially derived after the initial derivation. In the manner described above, the in-cylinder variable acquiring unit 230 derives transitions in in-cylinder pressure and in-cylinder temperature (in-cylinder pressure history and in-cylinder pressure history) in accordance with the crank angle.

The delay estimating unit 232 is configured to estimate a auto-ignition delay based on delay parameters (first parameters). The delay parameters include the in-cylinder pressure, the in-cylinder temperature, the injection amount of the fuel gas (air-fuel mixture concentration), and the composition of the fuel gas. The auto-ignition delay is a time taken from the start of the fuel injection to the auto-ignition.

A response surface of the auto-ignition delay is stored in advance in the engine controller 220. The response surface of the auto-ignition delay is created by associating the plurality of parameters including the in-cylinder pressure, the in-cylinder temperature, the composition of the fuel gas, the injection amount of the fuel gas (air-fuel mixture concentration) with the auto-ignition delay. For the composition of the fuel gas, for example, combination patterns of content ratios of components are registered in advance as described above. Based on a measured composition of the fuel gas, a pattern closest to the composition of the fuel gas is specified.

The response surface of the auto-ignition delay may be given, for example, in the form of a plurality of maps or in the form of a functional model. The delay estimating unit 232 derives (estimates) the auto-ignition delay based on the response surface of the auto-ignition delay and the delay parameters. As described above, the transitions in in-cylinder pressure and in-cylinder temperature in accordance with the crank angle are derived by the in-cylinder variable acquiring unit 230. The delay estimating unit 232 derives, for a plurality of time points (crank angles), the auto-ignition delay with use of the in-cylinder pressure and the in-cylinder temperature at each of the time points.

The auto-ignition predicting unit 234 sequentially integrates reciprocals of the auto-ignition delays derived by the delay estimating unit 232 in time series. The auto-ignition predicting unit 234 is configured to predict the time point at which an integrated value becomes equal to or larger than 1 as a auto-ignition timing. A predictive calculation of the auto-ignition timing through the above-mentioned integration of the reciprocals of the auto-ignition delays is called "Livengood-Wu integral", and is expressed by Expression 1.

[Math. 1]

$$\int_{t=0}^{\tau=te} \left(\frac{1}{\tau}\right)_{P,T} dt = 1 \qquad \text{(Expression 1)}$$

In Expression 1, the time is represented by a variable t, the auto-ignition timing is represented by a variable te, the auto-ignition delay is represented by a variable i, the in-cylinder pressure is represented by a variable P, and the in-cylinder temperature is represented by a variable T. With repetition of the integral until the integrated value becomes equal to 1, the auto-ignition timing (variable te) is derived (predicted).

The completion predicting unit 236 is configured to predict a combustion completion timing of the fuel gas, at which the combustion of the fuel gas supplied to the combustion chamber 108 is completed. More specifically, the completion predicting unit 236 is configured to predict the combustion completion timing based on the combustion speed of the fuel gas and the injection amount of the fuel gas.

The completion predicting unit 236 estimates a distribution (volume) of the air-fuel mixture of the fuel gas and the intake air in the combustion chamber 108 based on the injection amount of the fuel gas and the in-cylinder pressure. The completion predicting unit 236 estimates a time at which combustion spreads throughout the entire air-fuel mixture based on the combustion speed of the fuel gas, and obtains the estimated time as the combustion completion timing of the fuel gas.

Further, the completion predicting unit 236 may predict the combustion completion timing based on the in-cylinder pressure and the injection amount of the fuel gas.

FIG. 4A is a graph for showing an example of a heat-generation amount by the combustion of the fuel gas. FIG. 4B is a graph for showing an example of an integrated value of the heat-generation amount by the combustion of the fuel gas. As shown in FIG. 4A, when the fuel gas is combusted, heat is generated along with the combustion. The heat-generation amount can be estimated based on energy balance of the gas in the cylinder 102. The completion predicting unit 236 derives the heat-generation amount per hour being the amount of heat generated along with the combustion of the fuel gas based on the in-cylinder pressure and the in-cylinder temperature.

The completion predicting unit 236 integrates, as shown in FIG. 4B, the heat-generation amount per hour being the amount of heat generated along with the combustion of the fuel gas (integrated heat-generation amount). The completion predicting unit 236 sets a time point at which the integrated heat-generation amount exceeds a threshold value as the combustion completion timing. In this case, the threshold value is set to, for example, 95% of a total heat-generation amount being the amount of heat generated as a result of complete combustion of the injected fuel gas.

As described above, the completion predicting unit 236 may predict the combustion completion timing based on the in-cylinder pressure and the injection amount of the fuel gas.

The operation control unit 238 compares the auto-ignition timing predicted by the auto-ignition predicting unit 234 and the combustion completion timing predicted by the completion predicting unit 236. The operation control unit 238 controls the gas engine 100 based on a result of the comparison. The operation control unit 238 changes the operating conditions of the gas engine 100.

The operation control unit 238 changes, for example, the intake temperature, the intake pressure, the injection amount of the fuel gas (air-fuel mixture concentration), the fuel injection timing, and the compression ratio, which have been described above as the operating conditions. More specifically, the operation control unit 238 may control the cooler to change the intake temperature. The operation control unit 238 may control the supercharger (compressor) to change the intake pressure. The operation control unit 238 may also change opening and closing timings of the fuel valve 116a to change the injection amount of the fuel gas or the fuel injection timing or may change an ignition timing. Further, the operation control unit 238 may change opening and closing timings of the intake valve 110a and the exhaust valve 110b with use of a variable valve mechanism.

When the auto-ignition timing comes after the combustion completion timing, it is estimated that knocking does not occur. When the auto-ignition timing precedes the combustion completion timing, it is estimated that the knocking may occur.

Further, when the auto-ignition timing comes before the combustion completion timing and a time difference between the auto-ignition timing and the combustion completion timing is large, it is estimated that there is an allowance before the occurrence of the knocking. On the contrary, when the time difference between the auto-ignition timing and the combustion completion timing is small, it is estimated that there is no allowance before the occurrence of the knocking. The operation control unit 238 changes the operating conditions so that efficiency of the gas engine 100 is improved in accordance with the time difference between the auto-ignition timing and the combustion completion timing to such a degree that the knocking does not occur.

For example, it is assumed that the auto-ignition timing precedes the combustion completion timing and the time difference between the auto-ignition timing and the combustion completion timing is large. In this case, it is estimated that, unless the operating conditions are considerably eased (so that the knocking is less liable occur), the knocking cannot be avoided. On the contrary, in a case in which the time difference between the auto-ignition timing and the combustion completion timing is small, it is estimated that, even when the operating conditions are not considerably eased (so that the knocking is less liable to occur), the knocking can be avoided. The operation control unit 238 changes the operating conditions in accordance with the time difference between the auto-ignition timing and the combustion completion timing so that the knocking is less liable to occur while a decrease in efficiency of the gas engine 100 is reduced.

FIG. 5 is a table for showing processing performed by the operation control unit 238. When the auto-ignition timing comes after the combustion completion timing, the operation control unit 238 performs efficiency improvement control. When the auto-ignition timing precedes the combustion completion timing, the operation control unit 238 performs knocking suppression control.

As described above, in the engine control system 200, a degree of allowance before the operating conditions causing occurrence of the knocking is derived as the time difference between the auto-ignition timing and the combustion completion timing. The operating conditions are controlled in accordance with the time difference. Thus, there can be avoided a problem that the operating conditions are not changed even when there is room for the improvement of efficiency of the gas engine 100. Accordingly, the knocking can be suppressed while the degree to the occurrence of knocking is grasped.

Figure 6:
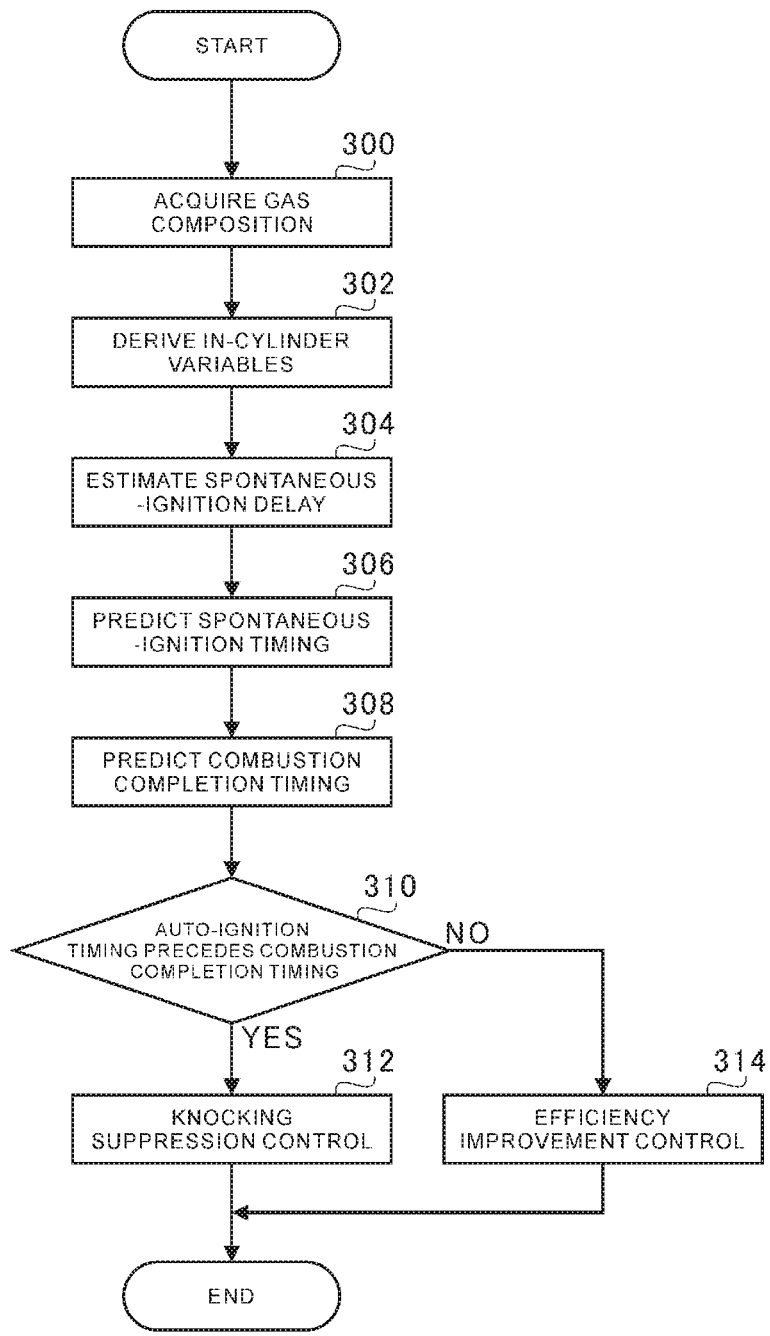
FIG. 6 is a flowchart for illustrating a flow of engine control processing.

FIG. 6 is a flowchart for illustrating a flow of engine control processing. The processing illustrated in FIG. 6 is repeatedly executed at predetermined intervals.

(Step 300)

The in-cylinder variable acquiring unit 230 and the delay estimating unit 232 acquire the (latest) result of measurement of the composition of the fuel gas, which is most lately measured by the gas-composition sensor 210.

(Step 302)

The in-cylinder variable acquiring unit 230 derives the in-cylinder pressure and the in-cylinder temperature based on the in-cylinder variable acquisition parameters including operating conditions of the gas engine 100 (the intake temperature, the intake pressure, the injection amount of the fuel gas (air-fuel mixture concentration), the fuel injection timing, and the compression ratio) and the composition of the fuel gas.

(Step 304)

The delay estimating unit 232 estimates the auto-ignition delay based on the delay parameters including the in-cylinder pressure, the in-cylinder temperature, the injection amount of the fuel gas (air-fuel mixture concentration), and the composition of the fuel gas.

(Step 306)

The auto-ignition predicting unit 234 sequentially integrates reciprocals of the auto-ignition delays derived by the delay estimating unit 232 in time series, and predicts the time point at which an integrated value becomes equal to or larger than 1 as the auto-ignition timing.

(Step 308)

The completion predicting unit 236 predicts the combustion completion timing based on one of the combustion speed of the fuel gas and the in-cylinder pressure, and the injection amount of the fuel gas.

(Step 310)

The operation control unit 238 compares the auto-ignition timing predicted by the auto-ignition predicting unit 234 and the combustion completion timing predicted by the completion predicting unit 236 with each other. The operation control unit 238 determines whether the auto-ignition timing precedes the combustion completion timing. When the auto-ignition timing precedes the combustion completion timing, the processing proceeds to Step 312. When the auto-ignition timing comes after the combustion completion timing, the processing proceeds to Step 314.

(Step 312)

The operation control unit 238 executes the knocking suppression control, and terminates the engine control processing.

(Step 314)

The operation control unit 238 executes the efficiency improvement control, and terminates the engine control processing.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the embodiment, the four-cycle engine has been described as the gas engine 100. However, the gas engine 100 may be a two-cycle engine. For example, the gas engine 100 may be a uniflow scavenging two-cycle engine.

Further, in the embodiment, there has been described that the in-cylinder variable acquiring unit 230 derives (acquires) the in-cylinder pressure and the in-cylinder temperature through the calculation. In this case, the knocking can be predicted before the occurrence of the knocking in one cycle. However, a pressure sensor and a temperature sensor may be provided to the cylinder 102. In this case, the in-cylinder variable acquiring unit 230 acquires output values respectively acquired by the pressure sensor and the temperature sensor as the in-cylinder pressure and the in-cylinder temperature. With the configuration described above, for example, the knocking in a target cycle can be predicted by using, for example, values acquired in a previous cycle. Further, a time point at which the actually measured in-cylinder pressure has a peak may be set as the combustion completion timing.

INDUSTRIAL APPLICABILITY

The present disclosure is applicable to an engine control system configured to control an engine in accordance with a composition of fuel gas.

What is claimed is:

1. An engine control system, comprising:
a delay estimating unit configured to estimate an auto-ignition delay based on a composition of fuel gas, an in-cylinder pressure and an in-cylinder temperature;
an auto-ignition predicting unit configured to predict an auto-ignition timing based on the auto-ignition delay to provide a predicted auto-ignition timing;
a completion predicting unit configured to predict a combustion completion timing of the fuel gas to provide a predicted combustion completion timing; and
a control unit configured to make a comparison between the predicted auto-ignition timing and the predicted combustion completion timing, and to control an engine to perform an efficiency improvement control in response to a determination that the predicted auto-ignition timing does not precede the predicted combustion completion timing, and to perform a knocking suppression control in response to a determination that the predicted auto-ignition timing precedes the predicted combustion completion timing.

2. The engine control system according to claim 1, wherein the delay estimating unit estimates the auto-ignition delay at each of a plurality of time points in a time period from start of fuel injection to auto-ignition, and
wherein the auto-ignition predicting unit predicts one of the time points, at which an integrated value of reciprocals of the auto-ignition delay becomes equal to or larger than 1, as the predicted auto-ignition timing.

3. The engine control system according to claim 2, further comprising an in-cylinder variable acquiring unit configured to acquire the in-cylinder pressure and the in-cylinder temperature,
wherein the delay estimating unit estimates the auto-ignition delay in accordance with values of the in-cylinder pressure and values of the in-cylinder temperature at the plurality of time points.

4. The engine control system according to claim 3, wherein the in-cylinder variable acquiring unit estimates the in-cylinder pressure and the in-cylinder temperature based on the composition of the fuel gas.

5. The engine control system according to claim 4, wherein the completion predicting unit predicts the combustion completion timing based on one of a combustion speed of the fuel gas and the values of the in-cylinder pressure, and an injection amount of the fuel gas to provide the predicted combustion completion timing.

6. The engine control system according to claim 5, wherein the control unit changes at least one of an intake temperature, an intake pressure, the injection amount of the fuel gas, a fuel injection timing, and a compression ratio.

7. The engine control system according to claim 4, wherein the control unit changes at least one of an intake temperature, an intake pressure, an injection amount of the fuel gas, a fuel injection timing, and a compression ratio.

8. The engine control system according to claim 3, wherein the completion predicting unit predicts the combustion completion timing based on one of a combustion speed of the fuel gas and the values of the in-cylinder pressure, and an injection amount of the fuel gas to provide the predicted combustion completion timing.

9. The engine control system according to claim 8, wherein the control unit changes at least one of an intake temperature, an intake pressure, the injection amount of the fuel gas, a fuel injection timing, and a compression ratio.

10. The engine control system according to claim 3, wherein the control unit changes at least one of an intake temperature, an intake pressure, an injection amount of the fuel gas, a fuel injection timing, and a compression ratio.

11. The engine control system according to claim 2, wherein the control unit changes at least one of an intake temperature, an intake pressure, an injection amount of the fuel gas, a fuel injection timing, and a compression ratio.

12. The engine control system according to claim 1, wherein the control unit changes at least one of an intake temperature, an intake pressure, an injection amount of the fuel gas, a fuel injection timing, and a compression ratio.

13. The engine control system according to claim 1, further comprising an in-cylinder variable acquiring unit configured to acquire the in-cylinder pressure value at a plurality of time points and the in-cylinder temperature value at the plurality of time points;
wherein the delay estimating unit estimates the auto-ignition delay in accordance with the in-cylinder pressure values and the in-cylinder temperature values; and
wherein the completion predicting unit predicts the combustion completion timing as a time at which an integrated heat generation amount exceeds a threshold value to provide the combustion completion timing.

14. The engine control system according to claim 1, wherein the efficiency improvement control includes at least one of advancing ignition timing or increasing compression ratio; and
wherein the knocking suppression control includes at least one of decreasing compression ratio, delaying ignition timing, increasing intake pressure, or decreasing intake temperature.

* * * * *